(12) United States Patent
Todd et al.

(10) Patent No.: US 6,609,985 B2
(45) Date of Patent: Aug. 26, 2003

(54) TENSIONER WITH VIBRATIONAL DAMPING

(75) Inventors: Kevin B. Todd, Freeville, NY (US); Mark E. Patton, Dryden, NY (US)

(73) Assignee: BorgWarner Inc., Troy, MI (US)

( * ) Notice: Subject to any disclaimer, the term of this patent is extended or adjusted under 35 U.S.C. 154(b) by 19 days.

(21) Appl. No.: 09/986,066

(22) Filed: Nov. 7, 2001

(65) Prior Publication Data

US 2003/0087713 A1 May 8, 2003

(51) Int. Cl.$^7$ ................................................. F16H 7/22
(52) U.S. Cl. ..................... 474/109; 474/103; 474/110
(58) Field of Search ............................... 474/101, 102, 474/109, 111, 119, 140, 110; 310/12

(56) References Cited

U.S. PATENT DOCUMENTS

| | | | |
|---|---|---|---|
| 3,490,302 A | 1/1970 | Turner et al. | 474/111 |
| 4,921,472 A | 5/1990 | Young | 474/111 |
| 5,266,066 A | 11/1993 | White | 474/111 |
| 5,425,680 A | * 6/1995 | Young | 474/111 |
| 5,434,467 A | * 7/1995 | Abe et al. | 310/366 |
| 5,458,222 A | 10/1995 | Pla et al. | 188/378 |
| 5,462,493 A | 10/1995 | Simpson | 474/111 |
| 5,498,127 A | 3/1996 | Kraft et al. | 415/119 |
| 5,545,007 A | 8/1996 | Martin | 415/133.2 |
| 5,594,168 A | * 1/1997 | Terajima | 73/496 |
| 5,656,882 A | 8/1997 | Lazarus et al. | 310/328 |
| 5,687,462 A | 11/1997 | Lazarus et al. | 29/25.35 |
| 5,775,715 A | 7/1998 | Vandergrift | 280/602 |

(List continued on next page.)

OTHER PUBLICATIONS

Journal Materiaux et Techniques, No. 12, pp. 31–37, Dec. 1994.

Warkentin, D.J. and Crawley, E.F., "Power flow and amplifier design for piezoelectric actuators in intelligent structures," Proceedings of the SPIE 1994 North American Conference on Smart Structures and Materials, paper No. 2190–27, pp. 283–294, Orlando, FL, Feb. 13–18, 1994.

Liu, K.; Jacques, R.; Miller, D., "Frequency Domain Structural System Identification by Observability Range Space Extraction," presented at the 1994 American Control Conference, Baltimore, MD, 1994.

Jacques, R.N. and Miller, D.W., "Multivariable Model Identification from Frequency Response Data," Proceedings of the $32^{nd}$ Conference on Decision and Control, Mar., 1993.

(List continued on next page.)

Primary Examiner—Thomas R. Hannon
Assistant Examiner—Vicky A. Johnson
(74) Attorney, Agent, or Firm—Fitch, Even, Tabin & Flannery; David Dziegielewicz

(57) ABSTRACT

A blade-type chain tensioner (10, 110) is provided including a shoe (30, 130) adapted to impart tension to a chain (16), a blade spring (28, 128) engaging the shoe (30, 130), a piezoelectric strain element (35, 135) coupled to the blade spring (28, 128) or the shoe (30, 130), and a circuit (34, 137) adapted to receive a voltage or voltage data signal generated by a sensor (33, 133) coupled to the blade spring and shoe assembly (28/30, 128/130) in response to a vibration having a predetermined frequency or frequency band occurring in the blade spring and shoe assembly (28/30, 128/130), wherein the circuit (34, 137) is adapted to operably interact with the piezoelectric strain actuator element (35, 135) to induce a vibratory moment therein effective to reduce the vibration of the chain tensioner (10, 110).

35 Claims, 7 Drawing Sheets

U.S. PATENT DOCUMENTS

| | | | |
|---|---|---|---|
| 5,812,684 A | 9/1998 | Mark | 381/86 |
| 5,857,694 A | 1/1999 | Lazarus et al. | 280/602 |
| 5,967,921 A | 10/1999 | Simpson et al. | 474/110 |
| 5,984,815 A | 11/1999 | Baddaria | 251/129.06 |
| 6,024,340 A | 2/2000 | Lazarus et al. | 251/129.06 |
| 6,138,996 A | 10/2000 | Hayashi et al. | 267/136 |
| 6,178,246 B1 | 1/2001 | Bebesel et al. | 381/71.2 |
| 6,191,519 B1 * | 2/2001 | Nye et al. | 310/316.01 |
| 6,354,972 B1 * | 3/2002 | Young | 474/101 |
| 6,404,107 B1 * | 6/2002 | Lazarus et al. | 310/328 |
| 6,420,819 B1 * | 7/2002 | Lazarus et al. | 310/330 |
| 6,486,589 B1 * | 11/2002 | Dujari et al. | 310/331 |

OTHER PUBLICATIONS

Yoshikawa, S. and Shrout, T., "Multilayer Piezoelectric Actuators—Structures and Reliability," The $34^{th}$ AIAA/ASME/ASCE/AHS/ASC Structures, Structural Dynamics and Materials Conference, Proceeding, pp. 3581–3586 (1993).

Warkentin, D.J.; Crawley, E.F.; and Senturia, S.D., "The Feasibility of Embedded Electronics for Intelligent Structures," Journal of Intelligent Material Systems and Structures, 3(3):462–482, Jul. 1992.

Miller, D.W.; Saarmaa, E.; Jacques, R.N., "Preliminary Structural Control Results From the Middeck Active Control Experiment (MACE)," Proceedings of the $33^{rd}$ AIAA/ASME/ASCE/AHS Structures, Structural Dynamics, and Materials Conference, Dallas TX, Apr. 1992.

Jacques, R.N. and Miller, D.W., "Physical Insight into the Simultaneous Optimization of Structure and Control," Presented at the $5^{th}$ NASA/DOD CSI Technology Conference, Tahoe, CA, Mar., 1992.

Yoshikawa, S.; Selvaraj, U.; Brooks, K.G.; and Kurtz, S.K., "Piezoelectric PZT Tubes and Fibers for Passive Vibration Damping," IEEE International Symposium on Applications of Ferroelectrics, Proceeding, pp. 573–576 (1992).

Fuda, Y.; Yoshida, T.; Ohno, T.; and Yoshikawa, S., "Ceramic Actuator with Three–Dimensional Electrode Structure," IEEE International Symposium on Applications of Ferroeclectrics, Proceeding, pp. 573–576 (1992).

Warkentin, D.J. and Crawley, E.F., "Prospects for Electronic Component Distribution in Intelligent Structures," Proceedings of ADPA/AIAA/AME/SPIE Conference on Active Materials and Adaptive Structures, pp. 386–391, Alexandria, VA, Nov. 4–8, 1991.

Jacques, R.N. and Miller, D.W., "Preliminary Design of H2 and H–Infinity Controlled Structures," Proceedings of the Adaptive Structures and Active Materials Conference, Alexandria, VA, Nov., 1991.

Blackwood, G.H.; Jacques, R.N.; and Miller, D.W., "The MIT multi–point alignment testbed: technology development for optical interferometry," Proceedings of the 1991 SPIE Conference, San Diego, CA, Jul., 1991.

Warkentin, D.J. and Crawley, E.F., "Embedded Electronics for Intelligent Structures," Proceedings of the $32^{nd}$ AIAA/ASME/AHS/ASC Structures, Structural Dynamics, and Materials Conference, pp. 1322–1331, Baltimore, MD, Apr. 1991.

Crawley, E.F.; How, J.P.; and Warkentin, D.J., "Analytical and Experimental Issues in the Design of Intelligent Structures," Proceedings of the $4^{th}$ NASA/DOD CSI Conference, Orlando, FL, Nov. 5–7, 1990.

Miller, D.W.; Jacques, R.N.; and de Luis, J., Typical Section Problems for Structural Control Applications, Paper # AIAA–90–1225, presented at the Dynamics Specialists Conference, Long Beach, CA, Apr. 1990.

Crawley, E.F.; Warkentin, D.J.; Lazarus, K.B., "Feasibility Analysis of Piezoelectric Devices," Space Systems Laboratory, Massachusetts Institute of Technology, SSL #5–88, Jan., 1988.

Crawley, E.F.; and de Luis, J., "Use of Piezoelectric Actuators as Elements of Intelligent Structures," AIAA Journal, vol. 25 (10), pp. 1373–1385, 1987.

Warkentin, D.J.; Haritonidis, J.H.; Mehregany, M.; and Senturia, S.D., "A Micromachined Microphone with Optical Interference Readout," Proceedings of the $4^{th}$ International Conference on Solid State Sensors and Actuators, pp. 291–294, Tokyo, Japan, Jun. 1987.

"Piezoelectric damper hones ski performance"—Module integrates piezoelectric material and electronics in ruggedized package, Terrence Lynch, Northeast Technical Editor, May 1996, *Design News*.

"Polymer Piezoelectric Transducers For Ultrasonic NDE", Yoseph Bar–Cohen, Tianji Xue and Shyh–Shiuh Lih, *NDTnet*, Sep. 1996, vol. 1, No. 09.

"Smart Materials and Structures—A Review", Shakeri, C., Noori, M.N., and Hou, Z., 11/96.

* cited by examiner

TENSIONER WITH VIBRATIONAL DAMPING

FIELD OF THE INVENTION

This invention relates generally to tensioners, which can be used with chain drives in automotive timing and power transmission applications, and, more particularly, to blade-type chain tensioners, with a vibration damping feature.

BACKGROUND OF THE INVENTION

Chain tensioning devices are used to control power transmission chains as the chain travels between a set of sprockets. Such chains usually have at least two separate strands, spans or lengths extending between the drive sprocket, such as a crankshaft sprocket, and the driven sprocket, such as a cam sprocket. The strand between the sprockets where the chain leaves the driven sprocket and enters the drive sprocket is frequently under tension as a result of the force imposed on the chain by the drive sprocket. The strand between the sprockets where the chain leaves the drive sprocket and enters the driven sprocket is frequently under reduced drive tension or slack due to the absence of driving force exerted on that strand. In systems with large center distances between the sprockets, both strands may evidence slack between the sprockets.

As a consequence, it is essential to the proper operation of the chain and sprocket system that a proper degree of engagement between the chain members and the sprockets is maintained during operation of the system. One aspect of maintaining such engagement of chain and sprocket is maintaining a proper degree of tension in the chain strands. The loss of chain tension can cause undesirable vibration and noise in the chain strands. The loss of chain tension also increases the possibility of chain slippage or unmeshing from the teeth of the sprocket, reducing engine efficiency and, in some instances, causing system failures. For example, it is especially important to prevent the chain from slipping in the case of a chain-driven camshaft in an internal combustion engine because misalignment of camshaft timing by several degrees can render the engine inoperative or cause damage to the engine.

The tension of the chain can vary due to wide variations in temperature and linear expansions among the various parts of an engine. Moreover, wear to the chain components during prolonged use also may produce a decrease in the chain tension. In addition, the intermittent stress placed on the chain devices in automotive applications due to variation in engine speed, engine load and other stress inducing occurrences can cause temporary and permanent chain tension.

To maintain tension in such transmission systems, tensioner devices have been used to push a tensioner member against the chain along a chain strand. Such transmission systems, typically press on the chain effective to mechanically deflect the strand path and impart the desired degree of tension on the chain. Current tensioner devices for performing this function include blade spring tensioners, which utilize one or more arcuate blade springs interlocked under tension with a relatively flat shoe made of plastic. The blade spring tensioner operates by permitting the chain to run across the plastic shoe. The spring blade(s) that is inserted within the shoe causes the shoe to creep or deform to a more arcuate shape as the shoe is heated, for example, from the contact of the shoe being driven across its surface. For example, U.S. Pat. No. 3,490,302 discloses such a chain tensioner where the blade spring is mounted to mechanically interlock with a shoe through a hole and pin combination. U.S. Pat. No. 4,921,472 discloses a blade spring tensioner having blade spring mechanically interlocked with a shoe through a passageway in the end of the shoe without the use of a pin. U.S. Pat. No. 5,266,066 discloses another blade spring chain tensioner in which a blade spring is constructed from a simple rectangular metal band formed in an arcuate shape and interlocked with a pocket in a shoe to provide a load to the shoe.

Unfortunately, the prior blade-type tensioners have certain drawbacks. For one, they are prone to prolonging oscillation of the chain. The harsh operating conditions of the engine induces varying tension in the chain. For instance, the cam shaft and crank shaft may induce torsional vibrations which cause chain tension to vary considerably. Moreover, abrupt tension variations may cause the chain to elongate in accordance with the chain stiffness. The blade spring reacts to the varying tension in the chain imparted by the torsional vibrations. Depending on the vibrational frequency, the spring force of the blade spring may react with a resonant vibration that establishes a prolonged oscillation of the chain. It is desirable to neutralize these inadvertent oscillations in the chain tensioning system as soon as possible and maintain a constant tension on the chain.

As one prior approach for addressing this oscillation problem, at least under certain limited conditions, U.S. Pat. No. 5,462,493 discloses a dual blade spring tensioner constructed of a pair of shoes in which one shoe is adapted to impart tension to a chain and overlaps the other shoe which is connected to a blade spring. The dual blade spring tensioner creates a passive mechanical damping feature by using the overlapping shoes to damp chain oscillations and vertical vibrations.

Despite these advances, the prior blade spring tensioning systems generally have found their applications limited to chain tensioning systems involving relatively short chain strands and low dynamic loads. More particularly, the prior blade spring tensioners generally have not performed as desired or needed on tensioning systems involving long strands or high dynamic loads, as they lack sufficient damping capability and/or offer inadequate tension control at system resonance in those more challenging environments for chain tensioning. Timing chains are subject to periodic tension inducement events in the engine, such as not only sprockets engaging the chain but also torque and cam engine vibrations transmitted through the engine block. The multiple forces acting on the tensioning system may accumulate or cancel, although some net vibrational frequency can and often does occur.

As a consequence, in chain tensioning systems involving long strands and/or high dynamic loads, hydraulic chain tensioner devices have been considered and used to provide dual functions of maintaining constant chain tension and dampening of chain movement. A hydraulic tensioner typically has a plunger slidably fitted into a chamber and biased outward by a spring to provide tension to the chain. Hydraulic pressure from an external source, such as an oil pump or the like, flows into the chamber through a check valve and passages formed in the housing of the device. The plunger may move outward against the chain, directly against a tensioner arm principally by an internal spring or similar structure and the plunger position is maintained in large part by hydraulic pressure within the housing. Such a hydraulic tensioner as used with a tensioner arm or shoe is shown in U.S. Pat. No. 5,967,921.

Regarding the mechanics of vibration damping with use of a hydraulic chain tensioner, as a chain traverses its path, it may vibrate or "kick" causing the chain to push against the tensioner arm. The force of the vibration or kick is transferred to the tensioner device causing the hydraulic plunger to move in a reverse direction away from the chain. This reverse movement is resisted by the hydraulic fluid in the chamber, as flow of the fluid out of the chamber is restricted by the check valve assembly. In this fashion, the tensioner achieves a so-called no-return function, i.e., movements of the plunger are relatively easy in one direction (toward the chain) but difficult in the reverse direction. In addition, rack and ratchet assemblies also may be employed to provide a mechanical no-return function.

Unfortunately, the hydraulic tensioners can be relatively expensive in comparison to conventional blade spring type chain tensioners. In addition, in some applications, the size and bulk of prior hydraulic tensioners can present difficulties in mounting and operating such tensioners. To overcome the difficulty created by the size of prior hydraulic tensioners, lever systems have been employed that allow the mounting of the hydraulic tensioner at a distance from the chain assembly. Through the lever system, the hydraulic tensioner imparts pressure on one or more strands of the chain assembly thereby maintaining chain tension. However, such lever mechanisms add to the complexity of the tensioner system and involve additional moving parts with a concomitant increase in maintenance expenses, problems and equipment failures. The use of such pivoted lever mechanisms may also diminish the ability of the hydraulic tensioners to dampen chain vibration. In addition, the mechanical limitations of the typical rod and piston design of hydraulic tensioners may limit the amount of slack which can be taken up by the tensioner during the life of the chain.

The use of piezoelectric materials has been proposed and implemented in some specific applications involving vibrational or acoustical damping, for example such as in skis, car body panels, noise attenuation in aircraft and vehicle operator/passenger cabins, washing machine panels, and aesthetic uses such as in LED "flashing light" athletic sneakers. Piezoelectricity is a property of certain classes of crystalline "piezoelectric" materials, including natural crystals of quartz, Rochelle salt and tourmaline, as well as manufactured ceramics, such as barium titanate and lead zirconate titanates (i.e., PZT). When mechanical pressure is applied to a piezoelectric material (e.g., by pressing, squeezing, stretching, etc.), the crystalline structure produces a voltage, which is proportional to the applied pressure. Conversely, when an electric field is applied, it is believed that the crystalline structure changes shape, thus producing dimensional changes in the material.

In most cases, the same element can be used to perform either task. For a positive voltage applied in the z-direction to a piezo material, a solid rectangular piece will expand in one direction (z) and contract in the other two (x and y); if the voltage is reversed, the piece will contract in the z-direction and expand in the x- and y-directions. Thus, piezo motors (i.e., actuators) convert electrical energy to mechanical energy, and piezo generators (i.e., sensors) convert mechanical energy into electrical energy. A bimorphic piezo actuator comprises two flat, thin layers of piezoelectric material permanently bonded together, back-to-back, and wired out-of-phase with one another. When one layer expands, the other layer contracts, causing the actuator to bend, much like a bi-metal strip.

Around 1995, Active Control Experts (ACX), of Cambridge, Mass., now a division of Cymer, Inc., utilized this double-layer piezoelectronic technology with a passive resonant circuit to reduce vibrations in skis, marketed as the K2 "Four" ski. The ACX devices dissipated mechanical energy as heat by first converting it to electricity and then passing it through a resistive shunt, in which a shunt circuit is tuned to damp only those vibratory modes that adversely affect ski performance. Piezoelectric actuators also have been provided with an active digital signal processing (DSP) control system for purposes of reducing random buffeting vibrations experienced in the tails of high-speed jet aircraft. The dissipation loads for these prior vibration systems are relatively low such that the shunt resistor circuit could tolerate the heat generated by dissipating a charge potential across a resistor. They did not involve high rpm dynamic mechanical systems and the like.

U.S. Pat. No. 5,458,222, entitled "Active Vibration Control Of Structures Undergoing Bending Vibrations," discloses piezo transducers on panels, such as jet engine ducts or washing machine panels, piezo actuated by an AC signal to pre-stress a structure, such that bending vibrations are canceled.

U.S. Pat. No. 5,498,127, entitled "Active Acoustic Liner," discloses a rigid backplate that supports a piezoelectric panel around an intake fan area, driven to reduce noise in a jet engine.

U.S. Pat. No. 5,812,684, entitled "Passenger Compartment Noise Attenuation Apparatus For Use In A Motor Vehicle," discloses a piezoelectric sensor and piezoelectric actuator attached to a side glass of an automobile at points along a fundamental node of vibration, wherein the actuators are vibrated in reverse phase to a signal generated by the sensor.

U.S. Pat. No. 6,138,996, entitled "Vibration Control Device For Automotive Panels," discloses a piezoelectric element used to counteract a stress of the panel created by vibration, thereby effectively increasing the rigidity of the panel. Modules including a single electromechanical transducer are applied to one side of a car frame member, or alternatively sandwiched upon opposite sides of a panel member. The '996 patent also discloses use of a resonant circuit to reduce vibration.

U.S. Pat. No. 6,178,246, entitled "Apparatus For The Active Suppression Of Noise Radiated By A Surface," discloses axially sensitive piezo noise sensors and a noise suppression actuator for a vehicle body wall. Further, U.S. Pat. Nos. 5,656,882, 5,687,462, and 5,857,694 disclose piezoelectric dampers that are suitable for numerous applications.

Blade spring tensioning systems for chains are typically used in highly dynamic systems such as moving power transmission and timing chains that bear against the surface of a blade spring and shoe assembly. The blade spring and shoe assembly is intended to be generally stationary in its equilibrium position, and to respond to and mitigate slack in the chain. Thus, the blade spring and shoe assembly often is subjected to significant forces during tensioning of the chain. Impacts and mechanical forces occur throughout the engine block, in addition to impacts associated with the chain and its sprocket engagements, and often are transmitted directly and indirectly from those sources and through the chain to the blade spring tensioner. Similar forces also are exerted on tensioners in other systems in dynamic and high stress environments. In many applications, such of these forces are recurrent at a constant vibrational frequency. For example, a timing chain may resonate at 5000 Hz when rotated at 5000 rpm. In many instances the associated vibrational energy is transmitted to the blade spring and shoe assembly, over time, can accelerate wear and reduce the durability of the blade tensioner system, the chain system, chain sprockets and associated system. Also, the desire in some instances to design vehicular engines with a smaller number of cylinders but operated at higher rpm, also possibly may contribute to increased chain vibration. The present invention provides vibration control effective to reduce such vibration in a blade tensioner.

SUMMARY OF THE INVENTION

According to the invention, a blade-type chain tensioner is provided including a shoe attachable to a support surface, a blade spring engaging the shoe, a piezoelectric strain actuator element operatively coupled to the blade spring and shoe assembly, and a circuit adapted to receive sensor signals generated by a sensor element coupled to the blade spring and shoe assembly, in which the circuit interacts with the piezoelectric strain actuator element to induce a vibratory moment therein effective to absorb and dissipate vibration in the chain tensioner when a sensor signal, received by the circuit, is associated with a vibration in the blade spring and shoe assembly occurring at a predetermined frequency or in predetermined frequency band. The damped blade-type chain tensioner of the present invention directly addresses the problem of chain-induced vibration in particular, as well as other vibration transmitted to the blade tensioner from other parts of the vehicle in general, to decrease wear or fatigue of the blade tensioner, thereby increasing its durability and thus extending its useful life.

In one general aspect of the present invention relating to a passive chain tensioner damping system, the circuit comprises a passive analog resonance circuit tuned to a predetermined resonance frequency or frequency band of a vibration of the blade spring and shoe assembly of the chain tensioner to be controlled. When vibration at the predetermined resonance frequency or frequency band occurs in the blade spring and shoe assembly, the mechanical stress or motion imparted to a sensor element coupled to the vibrating blade spring and shoe assembly is converted into a sensor signal supplied to the resonance circuit. In response to receiving a sensor signal associated with a blade spring or shoe vibrating at its predetermined resonance frequency or frequency band, the passive analog resonance circuit converts the vibrational mechanical energy into electric energy having a voltage, frequency and phase effective to induce a vibratory moment in the piezoelectric strain actuator element to which it is coupled, which counteracts and neutralizes the vibration in the blade spring and shoe assembly.

In one aspect of the passive damping embodiment of this invention, the sensor element comprises a piezoelectric transducer element attached to the blade spring or shoe that converts vibrational-induced stresses into electrical energy manifested as a voltage. When a predetermined resonant frequency or frequency band is of vibration occurs in the blade spring and shoe assembly, the voltage generated in the piezoelectric sensing element is inverted in phase by the passive analog resonance circuit and supplied back to a second piezoelectric transducer element that is mechanically coupled to the blade spring and shoe assembly. The second piezoelectric transducer element is used as a strain actuator element for conversion of the inverted voltage into a physical stress causing a physical deformation in the strain actuator element which counteracts and neutralizes the vibration of the blade spring and shoe assembly.

In general, the decision in tuning the passive analog resonance circuit to invert and supply voltage to the piezoelectric strain actuator element at either approximately a single frequency, or instead over a band of frequencies, takes into consideration a tradeoff between a higher efficiency damping and functional bandwidth (Q-factor). Ideally, the analog resonance circuit inverts the input sensor signal in phase and amplitude such that the output signal will have optimal efficiency in canceling out the resonant frequency in the blade spring and shoe assembly. Generally, the broader the frequency band tuned (filtered) for in the passive analog resonance circuit, the lower the damping efficiency (i.e., the absolute value of the amplitude of the inverted voltage becomes relatively lower relative to the sensed input voltage as a function of increasing bandwidth responsivity). The damping efficiency must be maintained high enough to permit reduction or cancellation of a resonant vibration in the blade spring and shoe assembly.

In another aspect of the invention, the piezoelectric strain actuating element and the piezoelectric transducer sensing element are generally discrete planar elements arranged in parallel to each other in an integral electromechanical piezoelectric transducer module coupled to a surface of the blade spring. In this configuration, the piezoelectric transducer sensing element generally, although not necessarily for all cases, is located closer to a surface of the blade spring or shoe, while the piezoelectric strain actuating element is attached on the side of the sensing element opposite to the blade spring or shoe. In this aspect, a vibratory moment induced into the piezoelectric strain actuating element directly counteracts resonant vibration occurring in the sensing element, which in turn, counteracts the resonant vibration in the blade spring or shoe to which the sensing element is in direct contact with. Alternatively, the piezoelectric transducer sensing element and the piezoelectric strain actuating element need not overlap with one another in a laminate form, but alternatively can be attached to different discrete locations along the surface of the blade spring or shoe suitable for resonant vibration counteraction. In one preferred aspect, the piezoelectric strain actuator element is coupled to the blade spring adjacent a point of predicted maximum deflection of the blade spring as expected during a vibration in the blade spring and shoe assembly at a predetermined resonant frequency or in a predetermined resonant frequency band.

The term "adjacent," as used herein in the context of the location of the piezoelectric strain actuating element, encompasses its direct attachment to a blade spring or shoe surface, or an indirect attachment or coupling via an intervening sensing element as described herein or any intervening binder or transducer module encapsulating material, and so forth, as long as the vibratory moment generated in the actuating element such as described herein can still reduce the vibration in the blade spring and shoe assembly in accordance with a purpose of the invention.

In an alternative general aspect of the present invention, the damping system functions as an active chain tensioner damping system. In one aspect of operation using the active damping system, a piezoelectric transducer sensing element is coupled to the blade or shoe of the blade spring and shoe assembly. It is used to "sense" the occurrence of a vibration of the blade spring or shoe (which also can be referred to as the "tensioner blade"), and generate a sensor signal indicating a characteristic (e.g., amplitude, frequency and/or phase) of the vibration in the blade spring and shoe assembly. A control unit includes active control logic comprising a microprocessor with mapping for processing the sensor signal supplied by the piezoelectric transducer sensing element and an active control circuit for determining the amplitude and frequency of the vibration detected in the blade spring and shoe assembly.

When a predetermined frequency or frequency band of vibration in the spring blade and shoe assembly is detected by the control unit, the active control circuit produces electric energy having a voltage, amplitude, and phase such that electric energy is coupled back into a separate piezoelectric strain actuating element attached to the blade spring and shoe assembly effective to create a vibratory moment therein which counteracts and neutralizes the existing vibration of the blade spring and shoe assembly. The predetermined frequency or frequency band can correspond to a resonant one, but this embodiment is not limited to that situation. In one aspect, a voltage signal is fed back into the piezoelectric material of the piezoelectric strain actuator element causing a controlled vibratory moment and change in physical dimensions of the piezoelectric strain element sufficient to dissipate the vibration sensed in the blade spring and shoe assembly via the sensing element as an intervening component (as these components are all mechanically coupled together).

In addition, in the active damping system, an amplifier can be used to increase the power of the feedback voltage signal generated by the active control circuit of the control unit to afford more robust vibration control. The amplifier generally is connected to a power source, such as a battery source, in this embodiment. By appropriate selection of the vibration frequency to which the control unit responds as well as the characteristics of the feedback signals using the active control circuit, the piezoelectric strain actuating element can be used as a force actuator to effectively counteract a resonant or other forced vibration in the blade spring or shoe from not only chain-induced vibration but also other vibrational inputs originating from other locations in the engine or vehicle. This active dampening configuration of the invention permits the piezoelectric elements to reduce vibration over a broad frequency range or individual preselected frequencies.

In an alternative aspect of the active damping mode of the invention, the vibration sensor is an accelerometer or similar microelectromechanical motion sensor physically coupled directly to the blade spring and shoe assembly, or alternatively as remotely attached to some other engine or vehicle component having vibrational forces that are transferred at least in part to the chain. The accelerometer is coupled to the control unit in any convenient manner effective to supply data signals thereto (e.g., via wireless or wired coupling).

The piezoelectric damping systems of this invention, accordingly, dissipates vibration of the blade spring (or shoe) caused by the blade spring (or shoe) reacting to varying tension in the chain, such as imparted by tortional engine vibrations. In this way, the spring force of the blade spring is curbed from reacting to the tortional engine vibrations with a resonant or other type of vibration that otherwise might establish a prolonged oscillation of the chain. It will be appreciated that the coupling of a piezoelectric strain actuating element to either one of the shoe or blade spring to dampen vibrations therein effectively dampens vibration in the tensioner as a whole, since these parts are all mechanically coupled together.

As will be appreciated, the tensioners according to this invention are unique, integrated multifunctional electromechanical systems for tensioning chains. The chain tensioners of this invention have excellent tensioning and vibrational damping performance capabilities. In addition, the chain tensioners of this invention also offer potential cost savings as non-hydraulically based chain tensioning and vibration dampening systems. Depending on the application, the tensioner of this invention reduces, and may eliminate, the need for expensive tensioner wear face materials, reduces chain noise and potentially increases the overall life of the tensioner parts and the reliability of the engine systems using a blade spring chain tensioner system. Further, by taking up chain slack of the strands in engine timing applications with less vibration, the present invention reduces the chance for changes in the timing between the crankshaft and the camshaft as the chain wears and/or slackens.

In one aspect of a chain tensioner that can be passively or actively damped by the vibrational control arrangements according to this invention, a shoe is mounted at one end to a stationary support, and a blade spring is mechanically interlocked with the shoe, such that the shoe can be positioned to bear against, and maintain tension in, a chain strand. The chain tensioner is positioned along a length of chain between sprocket gears with the shoe contacting the chain from outside of the chain path and imparting tension to the strand by displacing the chain path to eliminate slack in the chain strand. The chain displacement begins, or increases, as the temperature of the tensioner increases, for example, from frictional contact with the chain moving across a surface of the shoe. During such contact, the chain contacting shoe will tend to become less rigid, and the load from the blade spring causes the shoe to assume a more arcuate shape with ends of the shoe forced inward toward one another such that the convex side of the shoe extends further into the span of the chain, and thereby increasing the tensioning force applied by the shoe to the chain. The tensioning process is reversible when the shoe cools and becomes more rigid, thereby reducing the curvature induced by the blade spring.

BRIEF DESCRIPTION OF THE DRAWINGS

The foregoing and other objects, aspects and advantages will be better understood from the following detailed description of the preferred embodiments of the invention with reference to the drawings, in which.

Skilled artisans will appreciate that elements in the figures are illustrated for simplicity and clarity and have not necessarily been drawn to scale. Also, features in the various figures identified with the same reference numerals represent like features, unless indicated otherwise herein.

DETAILED DESCRIPTION OF THE PREFERRED EMBODIMENTS

Figure 1:
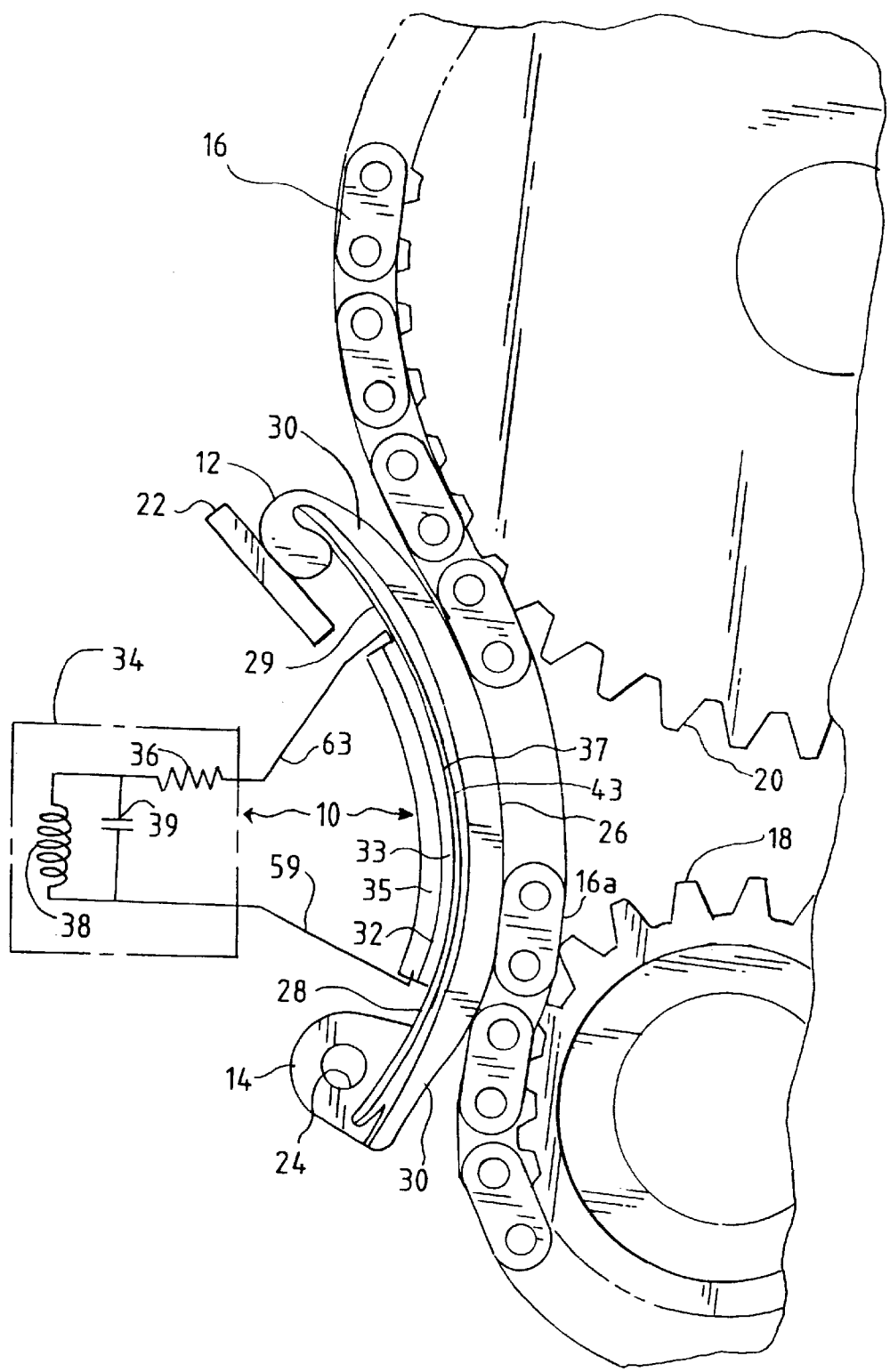
FIG. 1 is a schematic drawing of a chain tensioner including a passive damping system according to an embodiment of the present invention.

Referring now the figures, and FIG. 1 in particular, a passively damped blade spring tensioner 10 according to one aspect of the invention is illustrated, which is used to tension a chain at a location along a chain strand 16a thereof at a location between a driving sprocket 18 and driven sprocket 20. The tensioner 10 includes a plastic shoe 30, a blade spring 28, and a piezoelectric strain module 32, arranged in that respective order beginning nearest chain strand 16a and proceeding in lateral direction away from the chain strand. The shoe 30 includes a first end 12 and a second end 14. The shoe 10 has a chain contact region 26 extending between the first end 12 and the second end 14 in an arcuate curved shape. The chain contact region 26 of the arcuate shape of the shoe 30 is in contact with the chain strand 16a. The chain strand 16a is often the "slack" chain strand extending between driven sprocket 20 and driving sprocket 18, but the location for deploying the tensioner 10 may also be positioned at other locations on the chain.

The greater the surface of shoe 30 which is contacted by the chain strand 16a, the greater the tensionary force available for application by the tensioner 10. Adjustments in the amount of the chain strand 16a that are contacted by the shoe 30 of chain tensioner 10 is effected by the position of the tensioner and alterations occurring in the amount of arc in the shape of blade spring 28 of tensioner 10.

A first end 12 of tensioner 10 is slidably supported upon a stationary support 22. The first tensioner end 12 is adapted to bear against and slide on the support 22 when the chain 10 tensioner is in use. A second end 14 of tensioner 10 is fixed by a pivotal mount 24. This can be accomplished by constructing the second tensioner end 14 to include a bore, for example, adapted to receive a bolt or pivot pin, other suitable attachment means used for this purpose. The axis of rotation of the pivotal mount 24 typically is perpendicular to the plane of chain 16, and sprockets 18 and 20 (e.g., refer to FIG. 3). Thus, in this aspect, tensioner 10 pivots along its length within the same plane as chain 16 and sprockets 18 and 20.

When the arc of tensioner 10 increases, the first end 12 will slide against stationary support 22. An increase in the arc of the tensioner 10 will cause the tensioner 10 to bow out, increasing the area in contact via shoe 30 with chain strand 16a along chain contact region 26 and displacing the chain strand 16a from its path of travel.

The chain tensioner 10 has a blade spring 28 in association with, e.g., normally mechanically interlocked, to the chain-contacting shoe 30. Suitable techniques for associating the blade spring with the tensioner shoe are described, for example, in U.S. Pat. Nos. 3,490,302; 4,921,472; 5,266,066; and 5,984,815; which teachings are incorporated herein by reference. Shoe 30 is made of a rigid synthetic plastic material, which will creep, causing the deformation of the shoe, under load and elevated temperature, and the load is provided by the blade spring 28. The synthetic plastic material of the shoe 30 is preferably a heat stabilized nylon 6/6, but may also be composed of composite materials, such as, for example, Nylon 6/6 with a glass fill. A resilient deformable material generally is desirable because during operation, the heat generated or present in the operating environment (including engine heat) will cause shoe 30 to deform and become more arcuate under the load from blade spring 28. The greater arcuate shape of tensioner 10 at higher temperatures acts to keep tension on chain strand 16a.

Other materials which may be used in shoe 30, either in whole or in part, to achieve different performance characteristics include, for example, polyester ethylene ketone (PEEK). PEEK may be used for its greater wearability and durability characteristics, at least in chain contacting region 26 of shoe 30. The above and other materials also may be selected for the thermal expansion characteristics and functional characteristics to, for example, minimize the sliding resistance between shoe 30 and stationary support 22.

The blade spring 28 may be made of any suitable material, typically a heat-treated spring steel or a similar material with acceptable resilient characteristics. Suitable materials for this purpose are readily available and known to one skilled in the art. The blade spring 28 is generally rectangular and arcuately shaped at a formation radius that normally is less than the formation radii of shoe 30 and will exert sufficient tension on the shoe 30 in operation. Thus, the blade spring 28 typically is formed with a tighter curvature than shoe 30, which appears relatively flat (or with a significantly reduced curvature) in comparison. The rectangular shape of blade spring 28 commonly assists in evenly distributing tension across the spring's full length and across its full width. The shoe 30 and blade spring 28 are assembled such that the shoe 30 exerts a force on the blade spring 28 which tends to stretch the blade spring 28 into a flatter shape, and the blade spring 28 exerts a bias force or load on the shoe 30 that tends to force or curve the shoe 30 into a more arcuate shape.

As the shoe 30 is made of a semi-rigid material, such as plastic, it will deform when experiencing a load at high temperature. In operation, the temperature of the tensioner 10 increases from contact with the chain 16a moving across a surface of the shoe 30 and from other heat sources such as the heat generated in and about an automotive engine. A result of such a temperature increase, the shoe 30 will tend to become less rigid, and the load from the blade spring 28 causes the shoe 30 to assume a more arcuate shape with ends 12, 14 of the shoe 30 forced inward toward one another such that the convex side of the shoe 30 extends further into the span of the chain 16a, and thereby increasing the tensioning force applied by the shoe 30 to the chain 16.

In accordance with the invention, at least one piezoelectric damping module 32 is coupled to a surface of at least one of the blade spring 28 or shoe 30. In the aspect of the invention illustrated in FIG. 1, the piezoelectric damping module 32 includes a piezoelectric transducer sensing element 33 attached and mechanically coupled to a surface 29 of blade spring 28, and a piezoelectric strain actuating element 35. Other direct or indirect coupling approaches that provide the proper operation of the piezoelectric module 32 also may be used. Mechanical coupling of the piezoelectric damping module 32 to blade spring 28 or shoe 30 can be accomplished, for example, by bonding the material to the structure with epoxy or other suitable binder, or embedding the piezoelectric in the blade material itself.

The piezoelectric transducer sensing element 33 of the piezoelectric damping module 32 is electrically coupled to the resonance circuit 34, which is a passive analog resonance circuit. The piezoelectric sensing element 33 undergoes a change in stress/strain energy as the blade spring or shoe, to which the module 32 is coupled, vibrates at the assembly's resonant frequency or imparts motion on the piezoelectric strain element of the module 32. Consequently, the blade spring, or shoe, vibration or deformation is transformed by the oscillating piezoelectric material in sensing element 33 from mechanical force (strain energy) to voltage (electrical potential). This provides a sensor signal 59 that is supplied to the resonance circuit 34. The resonance circuit 34 is tuned to a specific resonant frequency or resonant frequency band at which it inverts the voltage that has been generated in the piezoelectric sensing element 33, resulting from vibration in the adjoining blade spring 28, and the inverted voltage signal is coupled back into the piezoelectric strain actuating element 35 to induce a stress causing a controlled change in physical dimension, e.g., a vibratory moment, in it effective to counteract the deformation in the sensing element 33 associated with a vibration in the blade spring and shoe assembly occurring at a predetermined resonant frequency or in predetermined frequency band. This dissipates and neutralizes the vibration in the blade spring and shoe assembly (as these components are all mechanically coupled together).

The piezoelectric transducer sensing element 33 and piezoelectric strain actuating element 35 each is constructed of piezoelectric materials that transduce strain energy and electric energy, and preferably which can be configured in sheet form, such as rectangular or square sheets and so forth. Such piezoelectric materials include as piezo ceramic materials, including, for example, piezoelectric lead zirconium titanate (PZT) ceramic sheets. By way of example, the piezoelectric strain element materials can be used in discrete sheet forms thereof, singly or as laminated stacks, assemblies or modules thereof, including sheet or laminate constructions thereof. The sheet(s) of the piezoelectric elements 33 and 35 of module 32, which is coupled to the blade spring 28 or shoe 30, is used in a size and dimensions sufficient to support the damping functions described herein for that component.

For example, the integral transducer module 32 can comprise the piezoelectric transducer elements 33 and 35 arranged back-to-back, in which each comprises PZT, PVDF (piezoelectric polyvinylidene fluoride), or another suitable piezoelectric material, formed as a rectangular planar plate. Pairs of conductive negative and positive electrodes (not shown) can be placed over the opposite major surfaces of each of the piezoelectric transducer elements 33 and 35, and the elements 33 and 35 will be wired inversely wired relative to each other from a polarity standpoint. The analog resonance control circuit 34 is electrically connected to such electrodes, and an epoxy or other suitable resinous package encapsulates the piezoelectric transducer elements 33, 35 including their electrodes, and the control circuit 34, therein through a thermal curing process. An electroconductive sheet can be interposed between the piezoelectric transducer elements 33 and 35 and the electrodes, and the two sides of the epoxy-encapsulated module 32 can be covered by polyimide surface film.

When the blade spring 28 undergoes a bending vibration at a resonant frequency, a cyclic stress is replicated in the piezoelectric transducer sensing element 33. As understood, this stress alternates between compression and tension at the frequency of the bending vibration of the blade tensioner assembly 28/30. This in turn causes a cyclic voltage to be supplied from the piezoelectric transducer sensing element 33 to the passive analog control circuit 34. When the blade tensioner 28/30 vibrates at its resonant frequency thereof, the control circuit 34 produces electric energy having such a voltage, frequency and phase relationship as to produce a stress in the piezoelectric strain actuating element 35 which counteracts the bending vibration of the blade tensioner 28/30.

In one aspect of the passive control embodiment, the control circuit 34 includes a passive analog resonance circuit tuned to a resonance frequency of the blade tensioner, which is desired to be controlled. The passive resonant circuit 34 could comprise, for example, a resistor-inductor (RL), resistor-capacitor (RC) or inductor-capacitor circuit (LC), or one using all three elements (RLC). In the function of the resonant circuit 34, an input signal 59 derived from the voltage at the sensing piezoelectric material 33 at the tuned resonant frequency is momentarily stored in a capacitor 39 until current in the inductor 38 reverses (flips) over and temporarily comes back), and then is flushed out. The sensed signal 59 is inverted, stored in the capacitor 39, and then is supplied back approximately 180 degrees out of phase as output signal 63 to the second piezoelectric element 35 of the piezoelectric sandwich module 32 to create a vibratory moment that offsets the vibrational resonance in the sensing element 33. In most instances, the actual required phase shift is not exactly 180 degrees, as the exact value applied is dependent upon the specific system, the frequency and structural damping in the system being controlled. For instance, the suitable phase shift could fall in the range of about 180±20°. Thus the Q value designed into the circuit will dictate whether the circuit is designed to invert a voltage amplitude at a narrow resonant frequency or a resonant frequency band.

By changing the resistance or inductance of the LC or LRC circuit, e.g., 500 rpm (5000) Hertz of mechanical resonance, the chain starts to vibrate and when that resonance is reached in the blade, the circuit inverts the phase of the voltage signal and sends the resulting inverted signal back to the other piezoelectric transducer material effective to quell the resonant vibration. In this way when the first piezoelectric element 33 is bent one way, the second piezoelectric 35 is bent in an offsetting amount relative to the first piezoelectric element 33. The control circuit 34 comprising such an analog resonance circuit is turned to the resonance frequency of the bending vibration of the chain tensioner assembly 28/30 to be controlled as described in greater detail below. For example, the circuit 34 may be formed by connecting a capacitor 39 and an inductor coil 38 in parallel, and connecting a resistor 36 in series with this parallel circuit as illustrated in FIG. 1. In an alternative aspect, the circuit may be formed by connecting a capacitor in parallel with the series circuit. The control circuit 34 is a passive analog circuit.

Figure 2:
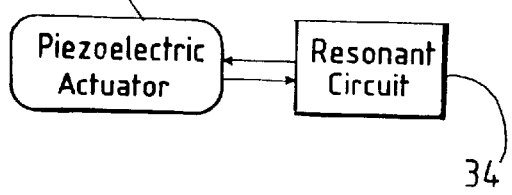
FIG. 2 shows a flow chart of a passive device for controlling vibration, according to an embodiment of the invention.

FIG. 2 schematically shows a flow chart of a passive device for controlling vibration applicable to the use of the passive analog resonance circuit aspect of the invention described herein.

In one aspect of this passive damping embodiment, the vibration control circuit frequency is designed (tuned) to match a single structural vibration resonance frequency—for example, a timing chain resonating at 5000 Hz. However, the range of frequencies to which the analog resonant circuit will respond (bandwidth) can also be varied as a matter of design, as is known to the art. That is, the passive analog resonance circuit design is a compromise between a higher efficiency damping and functional bandwidth (Q-factor). In one aspect, the passive analog resonance circuit 34 is designed to have a very high (Q) quality factor, so that the circuit resonates within only a relatively narrow frequency range, other frequencies are filtered out. When the circuit is designed for a high Q, the circuit yields a very efficient phase shift amplitude translation. By contrast, if the circuit is designed with a low Q value, the circuit 34 will react to a relatively larger band of frequencies, although relatively less efficient amplitude translation will be achieved.

In one aspect, the piezoelectric strain actuating element 35 and the piezoelectric transducer sensing element 33 are arranged in parallel to each other in an integral electromechanical piezoelectric transducer module 32 coupled to a surface 29 of the blade spring 28. In one more particular aspect, the piezoelectric strain actuator element is coupled adjacent to the blade spring 28 at least along a longitudinally central surface region 37 thereof. In yet another aspect, the piezoelectric strain actuator element 35 is coupled to the blade spring 28 adjacent a point of maximum deflection 43 of the blade spring 28 predetermined as being located where a bending vibration in the blade spring and shoe assembly 28/30 occurs at a predetermined resonant frequency or in a predetermined resonant frequency band, effective to counteract and dissipate the vibration sensed in the blade spring and shoe assembly.

As to the geometry of the piezoelectric transducer component of either or both piezoelectric element 33 or piezoelectric 35, in one aspect the piezoelectric transducer strips 33 and 35 each is sized to about 10–5 inch (about 0.1 micron) thick generally planar strips of generally uniform thickness, and are about 2 inches wide by 3 inches long, but these sizing dimensions can vary of course depending on the particular blade dimensions at hand. Total coverage is not necessarily required. Alternatively, the counterforce can be controlled by increasing surface area, thickness, or placement location.

In an alternative aspect, the counteracting transducer could be applied at the opposite ends of the blade to create leverage for bending the blade against the vibrational moment in the sensing piezoelectric. Generally, for sensing, it is preferable to place the piezoelectric at the blade region of highest strain. Although for the passive mode of the invention, the sensor and counteracting transducers are conveniently sandwiched together, the sensor and actuator do not necessarily have to co-extensive in their location relative to the blade spring. In the active sensing mode of the invention, a vibration is sensed on the blade or another part of the engine correlated with resonant vibrational frequencies in the blade. The voltage sensed at the sensing transducer is processed by an on board microprocessor. A force is transferred to another location where a piezoelectric transducer is fixed effective to counteract the resonant vibrational energy in the blade spring. The chain vibration creates cabin noise. In another aspect, acoustic sensors could be located in the vehicle cabin to activate the deflector piezoelectric. The sensing piezoelectric in this aspect thus can mitigate impact forces created between the chain and sprocket as well as vibrations due to chain wear.

In another aspect of the passive vibration damping according to this invention, an accelerometer or motion sensor, or similar measuring sensors, can be used to detect vibration or motion in the blade spring and shoe assembly in place of the piezoelectric sensing element 33.

In an alternative passive damping tensioner system according to another aspect of the invention, the tensioning and damping system of FIG. 1 is modified such that piezoelectric transducer module 32 has a single piezoelectric sensor actuator element, such as element 33 alone, attached to spring blade 28 and its strain-induced electrical output is connected across a shunt loop (not shown) containing a resistor and a filter connected across the top and bottom electrodes of the piezoelectric sensor element 33. When blade spring 28 vibrates so as to create a strain in piezoelectric sensor element 33, which is converted therein into a voltage, and the charge is dissipated via the shunt loop. As a consequence, the strain changes occurring in blade spring 28, and sensor element 33 as well, from vibration which are within the band of the filter will be damped.

Figure 3:
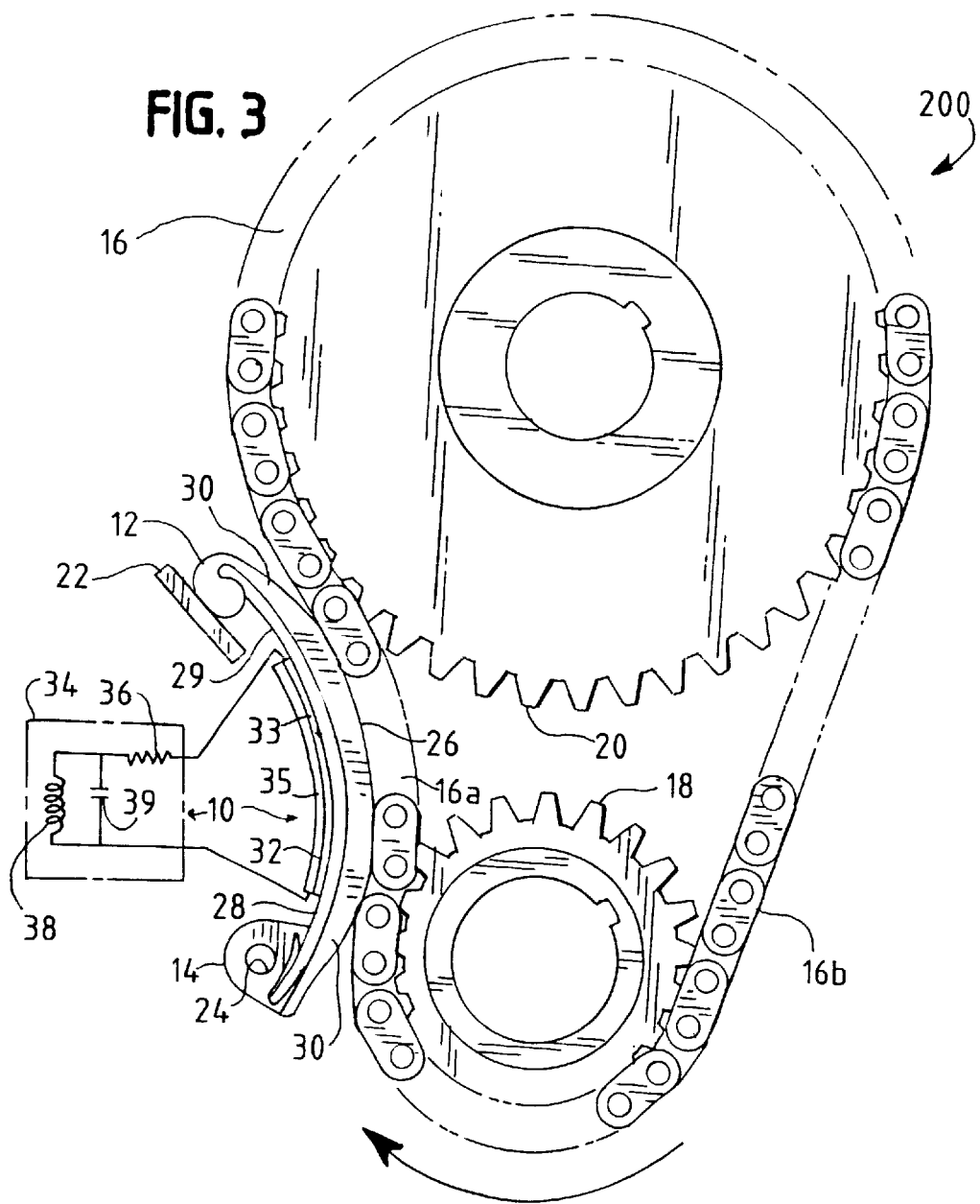
FIG. 3 is a schematic drawing of a chain tensioner system according to an embodiment of the invention which tensions a drive chain as it travels between a set of sprockets (i.e., a drive socket and a driven socket), using a tensioner of the type shown in FIG. 1.

FIG. 3 is a schematic drawing of a chain tensioner system 200 being used to tension drive chain 16, which includes strands 16a and 16b, as it travels between a set of sprockets (i.e., a drive socket 18 and a driven socket 20) using the multifunctional tensioner system 10 of FIG. 1. The tensioner system 200 can represent, for example, an engine timing system, including a crankshaft sprocket 18 (the drive sprocket) and camshaft sprocket 20 (the driven sprocket). In this aspect, the tensioner 10 is located along chain strand 16a between the two sprockets 18 and 20. The tensioner 10 could be mounted to the engine block at pivotal end 24. The shoe 30 has a wear face 26 positioned to contact the outside portion of the chain strand 16a, in the manner described above. The shoe 30 optionally can have a chain contacting wear face 26 with a flat central face and raised edges to form a channel through which the chain 16 travels.

One or more tensioner systems 200 also may be mounted to contact the inner portion of the strands of chain 16, or, in some applications, both the inner and outer portions of the chain 16. In applications with multiple tensioner systems 200, the shoes of the systems may work in tandem, including arrangements where one or more shoes 30 contact the outer chain surfaces, and cooperate to provide chain tensioning and chain vibration damping.

Figure 4:
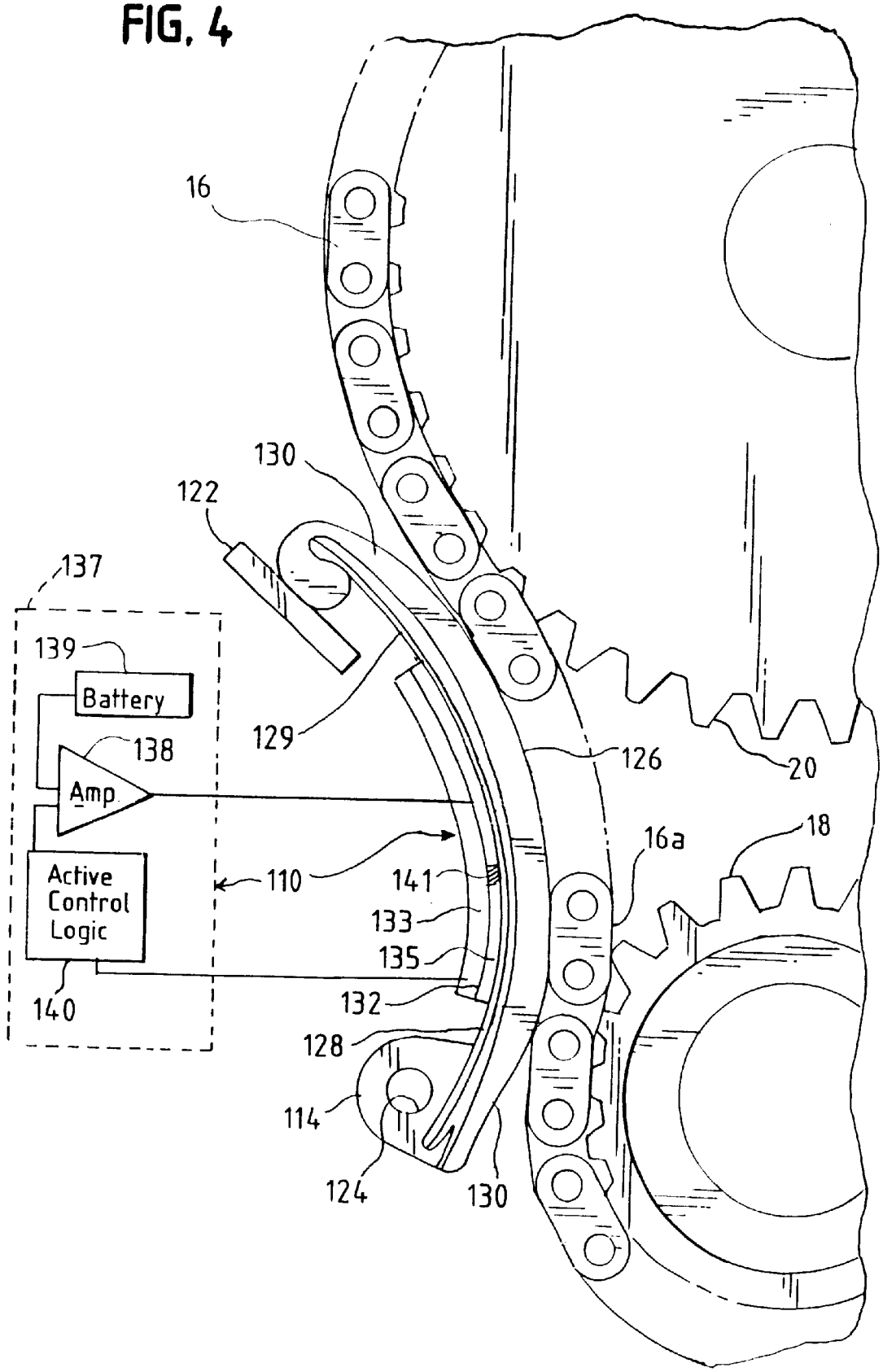
FIG. 4 is a schematic drawing of a chain tensioner including an active damping system according to another embodiment of the present invention.

In another aspect, an active circuit is employed to control undesired vibration and motion in a blade tensioner. In this respect, FIG. 4 illustrates another aspect of the present invention including a tensioner 110 which has the same general configuration as tensioner 10 of FIG. 1 except that an active piezoelectric damping system is provided. Tensioner 110 has a first end 112, second end 114, pivotal mount 124 and blade spring 128. The first end 112 slides against stationary mount 122.

The tensioner 110 has an arcuate shape within the plane including tensioned chain strand 16a, and sprockets 20 and 18. The tensioner 110 contacts chain strand 16a in chain contact region 126 and the amount of tension applied is related to the size of chain contact region 126, the positioning of the tensioner 110 and the arc of the tensioner 110. As with the tensioner 10, as discussed above, as the tensioner 110 bows out more due to the decrease in radius of curvature, the greater the amount of chain from chain strand 16a that is contacting the outside surface of tensioner 110.

Like tensioner 10 of FIG. 1, the tensioner 110 has a chain contacting shoe 130 and a blade spring 128. In the aspect of FIG. 3, a bimodal piezoelectric strain element 132 is connected to blade spring 128 and/or shoe 130. For example, the piezoelectric element 132 can be bonded to or embedded within blade 128. The piezoelectric element 132 is part of an active piezoelectric damping system, and includes at least one sensing portion and at least one actuator element or portion, referred to in FIG. 4 by corresponding reference numerals 133 and 135, respectively. The piezoelectric element 132, in addition, is connected to a control circuit or other control system 140.

The piezoelectric strain sensing portion(s) 133 and strain actuating element(s) 135 both can be formed of piezoelectric materials. They also may be formed of a combination of materials providing similar active damping properties. The piezoelectric elements comprise a piezoelectric material that produces a voltage when the material is subjected to physical stress or deformation (e.g., bent, stretched, pressed, and so forth). Conversely, when a voltage is applied to the piezoelectric material it will cause a change in physical dimensions of the element containing the piezoelectric material. For example, changes in physical dimensions induced to the piezoelectric material, creates a vibratory moment providing increased resistance to strain in contacted piezoelectric sensing material elements and the blade spring and shoe assembly.

Various possible ways of co-locating a sensing portion and actuator element in a common piezoelectric element structure are within the scope of the invention. For instance, in FIG. 4, a sensing portion 133 and an actuator element 135 are illustrated as being integrally arranged back-to-back to form opposite sides of the same planar piezoelectric element 132. The two piezoelectric elements 133 and 135 can be arranged back-to-back and wiring appropriately such that their negative and positive terminals are reversed. The AC drive voltage generated in strain actuator element 135 by control unit 137, discussed in more detail below, is approximately 180 degrees out-of-phase with the vibratory motion of the sensing element 133 in this illustration, thereby canceling and dissipating that vibration. Alternatively, the sensing and actuator functions alternatively may be combined in other configurations, such as in a single layered piezoelectric strain element with arrangement of the sensing portion and actuating element as laterally or longitudinally spaced in the same plane attached to the spring blade or shoe, or in multiple layer elements providing similar functional characteristics.

In this active damping aspect of the invention, the tensioner 110 can be piezoelectrically damped across a broad frequency band or individual preselected frequencies. Referring to FIG. 4, in one aspect of operation using this active damping system, a piezoelectric transducer sensing element 135 is coupled to the surface 129 of blade 128 (or shoe 130) of the blade spring and shoe assembly 128/130 and also to a damping control unit subassembly 137 of the chain tensioner 110.

Figure 5:
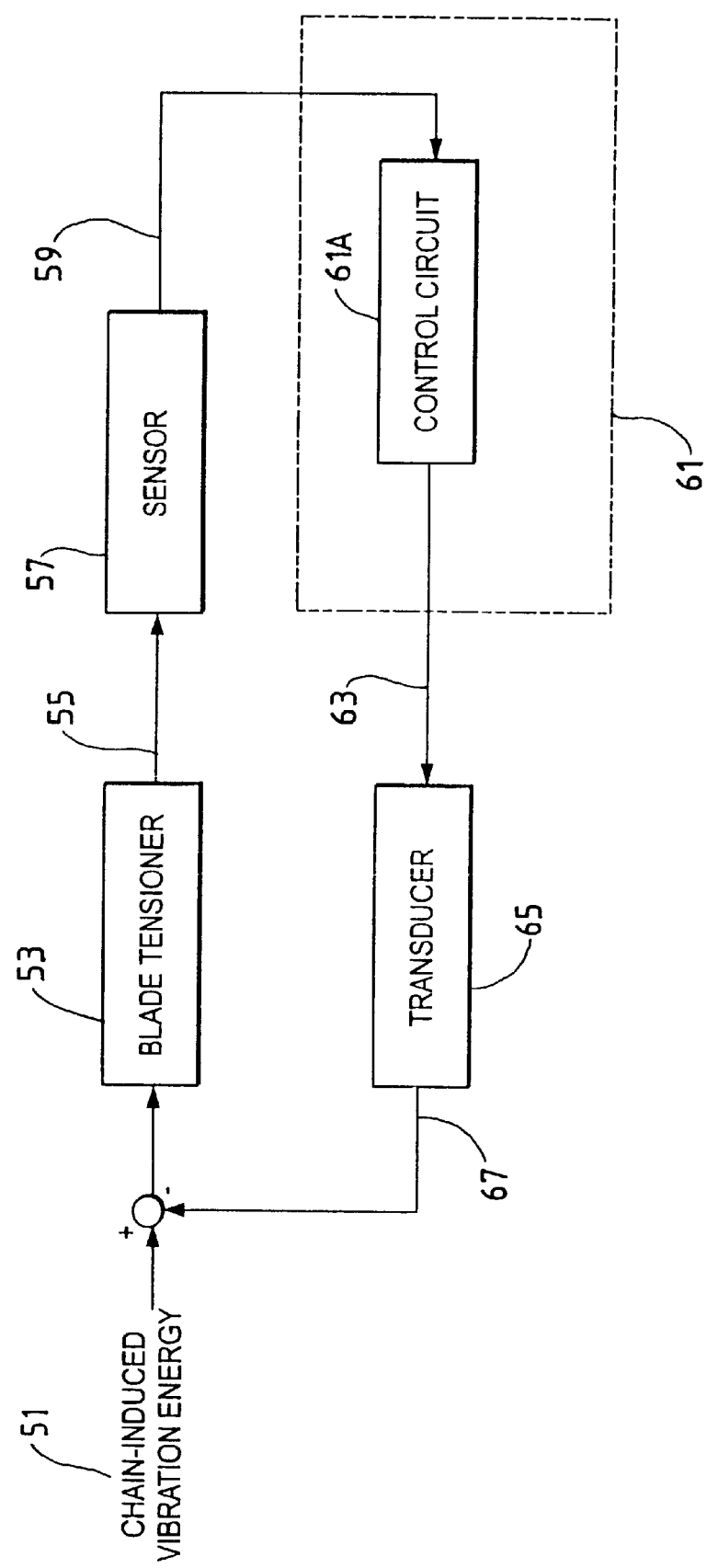
FIG. 5 shows a flow diagram of a chain tensioner system including passive or active vibration control, such as illustrated in FIG. 1 or FIG. 4, respectively, according to aspects of the present invention.

FIG. 5 is a generalized block diagram of the process flow of an aspect of the invention in which a chain-induced vibration energy 51 is transmitted to a blade tensioner 53, which causes a vibration in the blade tensioner 53 at a frequency 55 that is detected by sensor element 57, which can be coupled thereto. The sensor element 57 generates an input signal 59 supplied to a control unit 61 including a control circuit 61A. The sensor signal 59 indicates a characteristic(s) (e.g., amplitude, frequency and/or phase) of the vibration occurring in the blade spring and shoe assembly 53. The control circuit 61A of control unit 61 transforms (passively or actively) the input signal 59 into an output signal 63, an electrical signal, sent to a piezoelectric transducer 65. The piezoelectric transducer 65 converts the output signal 63 to mechanical energy 67 which changes a physical dimension of the transducer, such as in the planar direction thereof, effective to create an offsetting force against the chain-induced vibration in the blade tensioner 53. That is, the control unit 61 generates an output signal 63 supplied to a transducer 65 effective to generate a vibratory moment 67 in the transducer 65 effective to counteract the vibration sensed in the blade spring and shoe assembly. It is understood that the control unit 61 including a control circuit 61A as shown in FIG. 5 can represent an active control unit or a passive control unit according to different embodiments of the invention as described herein. The predetermined frequency or frequency band that is detected by sensor element 57 and transformed by control unit 61, can correspond to a resonant one, but this aspect of the invention is not necessarily limited to that situation. For example, resonant or non-resonant vibrations occurring in the blade tensioner could be counteracted using this embodiment of the invention.

Figure 6:
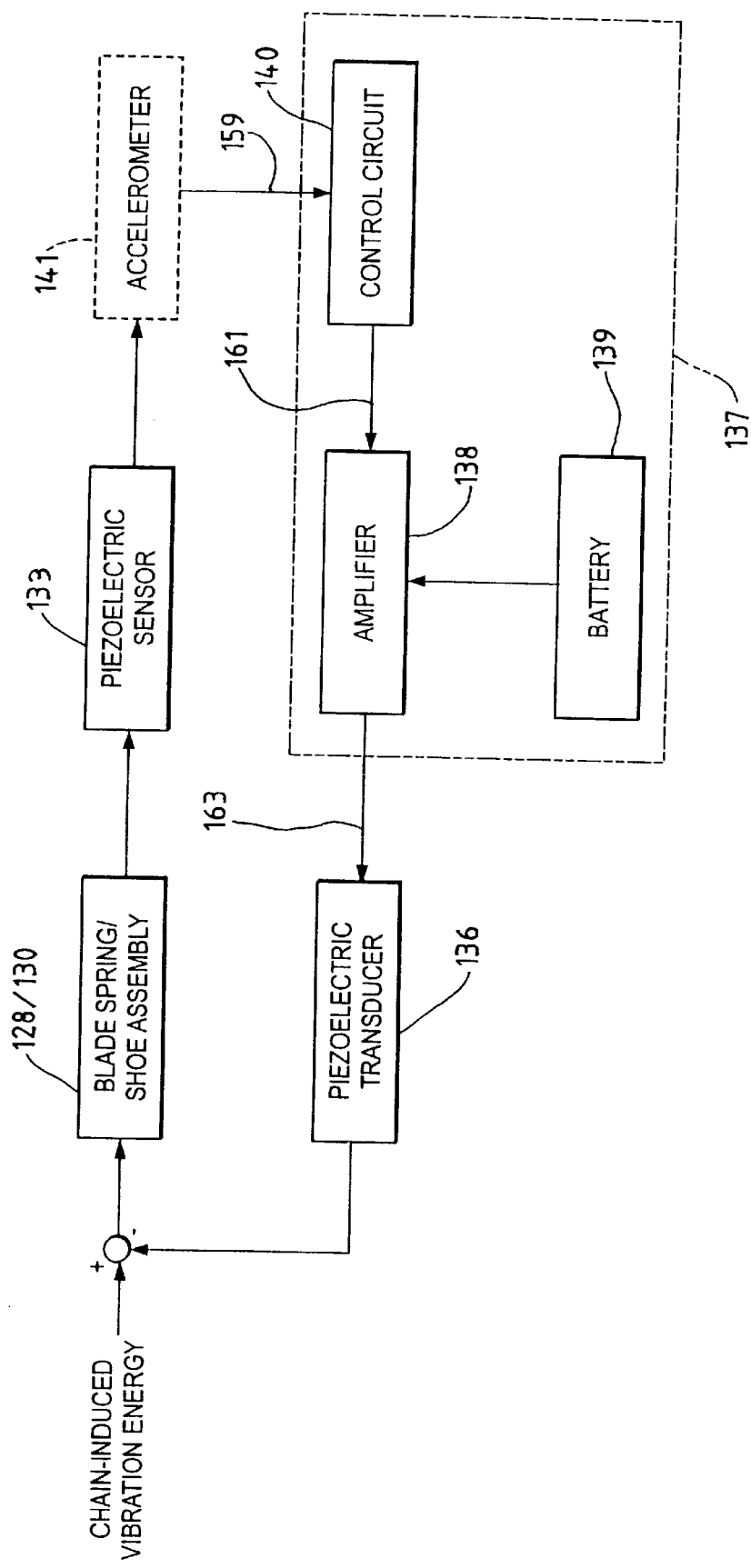
FIG. 6 shows a flow diagram for use of a chain tensioner system including active vibration control, such as illustrated in FIG. 4, using open-loop and feedback control, according to an aspect of the present invention.

FIG. 6 illustrates a flow chart for use of a chain tensioner system including vibration control, such as illustrated in FIG. 4, using open-loop and feedback control, according to an aspect of the present invention. In the active damping control aspect of this invention in particular, such as indicated by the flow chart in FIG. 6, the control unit 137 includes active control logic comprising a microprocessor and an active control circuit 140 for determining from input signal 159 the amplitude and frequency of the vibration detected in the blade spring and shoe assembly by a sensor element, i.e., a piezoelectric sensor 133, or, alternatively, an accelerometer 141, and calculating or determining the AC output voltage signal 63 from input signal 59 needed to be supplied to piezoelectric transducer 135 to cancel the bending vibration sensed in the blade spring and shoe assembly 128/130.

When a predetermined frequency or frequency band of vibration in the spring blade and shoe assembly is detected by the control unit 137, the active control circuit 140 produces electric energy having a voltage, amplitude, and phase such that electric energy is coupled back into a separate piezoelectric strain actuating element 136 attached to the blade spring and shoe assembly 128/130 effective to create stress therein resulting in a vibratory moment which counteracts and neutralizes the existing vibration of the blade spring and shoe assembly. In one preferred embodiment, the predetermined frequency or frequency band detected by control unit 137 is a resonant frequency. In one aspect, a drive voltage signal 163 is fed back into the piezoelectric material of the piezoelectric strain actuator element 135 causing a stress resulting in a controlled vibration in the piezoelectric strain element 135 sufficient to dissipate the vibration sensed in the blade spring and shoe assembly via the sensing element 133 as an intervening component (as these components are all mechanically coupled together).

In addition, in the active damping system, an amplifier 138 can be used to increase the power of the feedback voltage signal 161 outputted directly by the active control circuit 140 of the control unit 137 to afford more robust vibration control. The amplifier 138 generally is connected to a power source 139, such as a battery source, in this embodiment. By appropriate selection of the resonant vibration frequency to which the control unit 137 responds as well as the characteristics of the feedback signals using the active control circuit 140, the piezoelectric strain actuating element 135 can be used as a force actuator to effectively counteract the resonant or forced vibration in the blade spring or shoe from not only chain-induced vibration but also other vibrational inputs originating from other locations in the engine or vehicle.

The piezoelectric material in actuator element 135 transforms the electrical signal 63 obtained as feedback from the active control logic 140 into mechanical or strain energy, such that the piezoelectric element 135 can be used as a force actuator that actively resists vibratory motion/energy present in the tensioner 128/130. Put another way, when an electric signal is applied to the piezoelectric material in actuator element 135 in the correct direction the material imparts a strain in its surface causing it to flex. The response of the piezoelectric material is extremely rapid so that the target structure, such as blade spring 128 and the associated tensioner structure, can be effectively vibrated at a frequency by the external input signaling. By controlling the output signal 63, the piezoelectric material in actuator element 135 can effectively counteract the resonant or forced vibration in the tensioner structure 128/130.

Figure 7:
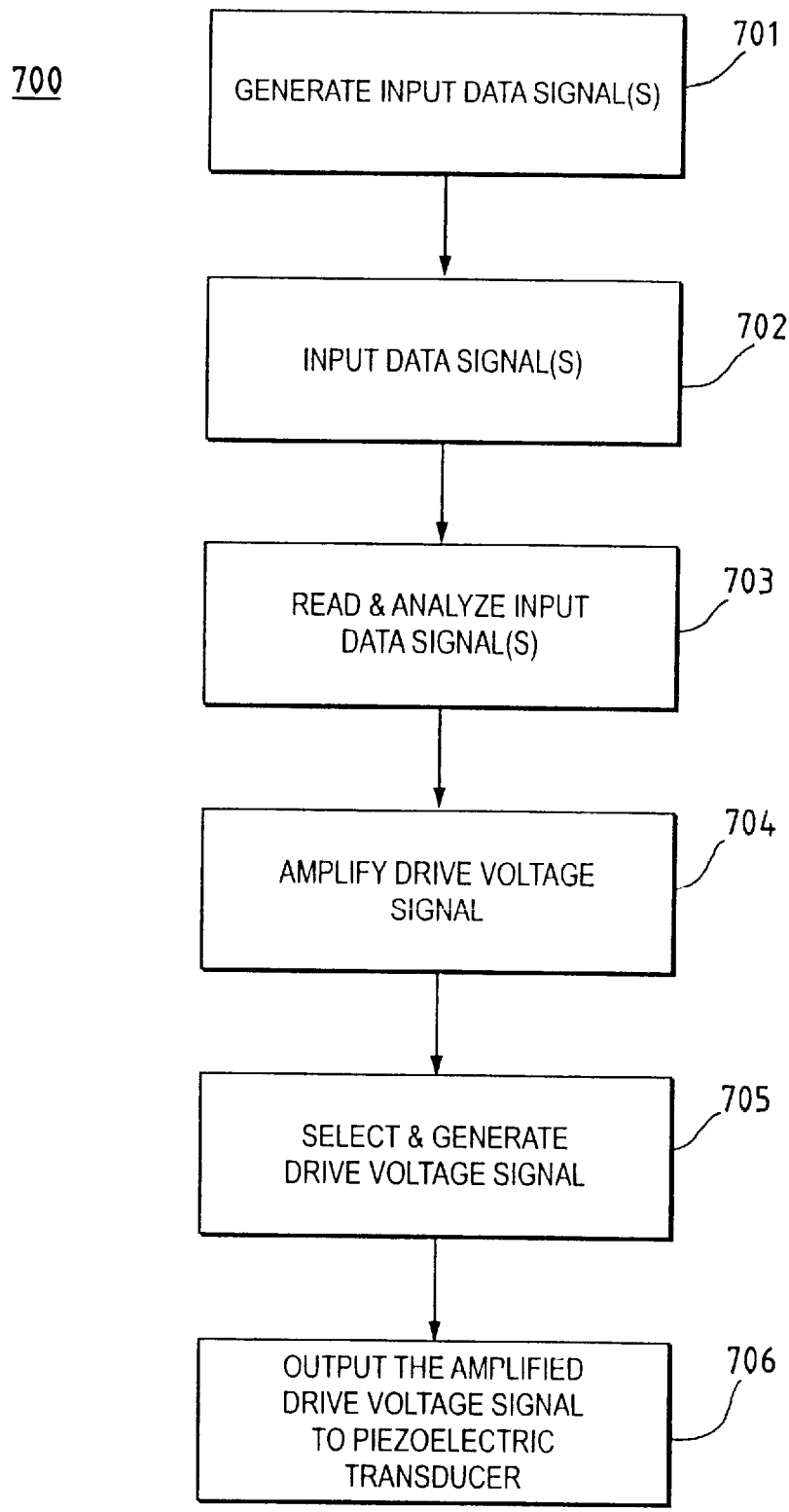
FIG. 7 is a block diagram illustrating signal processing logic used in effecting damping in a chain tensioner system including active vibration control, such as in a chain tensioner system as illustrated in FIG. 4, according to another aspect of the invention.

FIG. 7 is block diagram illustrating generalized signal processing logic 700 that can used to support the active vibration control used in a chain tensioner system as illustrated in FIG. 4. Many of the hardware features mentioned below in the description of this logic were previously discussed, and reference is made thereto. In step 701, the input voltage signal 159 is generated within a piezoelectric sensing element 133 attached to the blade spring and shoe assembly, which data signal is inputted to the control circuit 140 in step 702. It will be appreciated that the generation of the input signal 159 and its input to the control circuit 140 occurs virtually simultaneously in real time. In Step 703, control circuit 140, including a programmable or preprogrammed microprocessor having suitable embedded software or logic for the purposes described herein, which will read and analyze the acquired data signal 159. This can involve, for example, a comparison to database information or use of a control map to relate variables such as frequency, amplitude and phase of vibration of the acquired signal 159 to a "known" vibrational event for the blade spring and shoe assembly. The control map could be developed in advance based on structural analysis studies previously performed on the blade and spring assembly. The microprocessor also could add new data acquired during the service life of the system, and make that part of the database. Optionally, at step 702, input data signals also could be acquired from other locations within the engine block, such as from an accelerometer sensor located on the camshaft cover and so forth, to provide a large sampling of data all being fed concurrently to the control circuit 140, in which the various data signals are related to vibrational activity and motion throughout the engine that might affect vibration in the chain.

In step 704, on-board programming directs the control circuit to generate a drive voltage signal 161 having a suitable voltage, amplitude, and phase such that when the electric energy generated by the control circuit is coupled back into the separate piezoelectric strain actuating element 136, it will create the mechanical stress therein effective to counteract and dissipate the existing vibration of the blade spring and shoe assembly. The drive voltage signal 161 can be amplified, as indicated in step 705, after being outputted from the control unit 140 to increase the actuation force generated in the piezoelectric actuating element 135. In step 706, the amplified drive voltage signal is outputted and transmitted to the piezoelectric transducer. The microprocessor of the control circuit 140 optionally can be programmed to control the level of amplification imparted in this regard.

In the active damping control system used in the tensioner such as shown in FIG. 4, control unit 137 has adjustment control capability permitting tuning to any applicable vibratory frequency range for inducing vibrational damping in tensioner 110. Therefore, it can operate at any vibratory frequencies selected for the active control logic 140. This permits the piezoelectric actuator element to reduce vibrational energy in the tensioner over a broad frequency range and/or at one or more single frequencies, which could be resonant or otherwise depending on the situation at hand.

This method for active damping control is highly effective, particularly when additional information (i.e., initial guess) about the excitation frequency is included, such as, for example, information from an accelerometer 141. For chain-induced excitation, a measured or calculated excitation frequency (i.e., pitch frequency) is readily available. In a fully developed system, it is also possible to utilize a full feed-forward system, based solely on the known chain excitation information.

In this embodiment using active damping control, the data signals representing one or more of these characteristics, and can use a "control map" to relate variables such as frequency, amplitude and phase of sensed vibration to the data signals representing chain vibration characteristics, generating a drive voltage signal which is transmitted from the control circuit 140. A control signal derived from this data is amplified by an amplifier 138 and the resulting electric energy 63 is applied to the piezoelectric actuator 135 to counteract the vibration.

Figure 8:
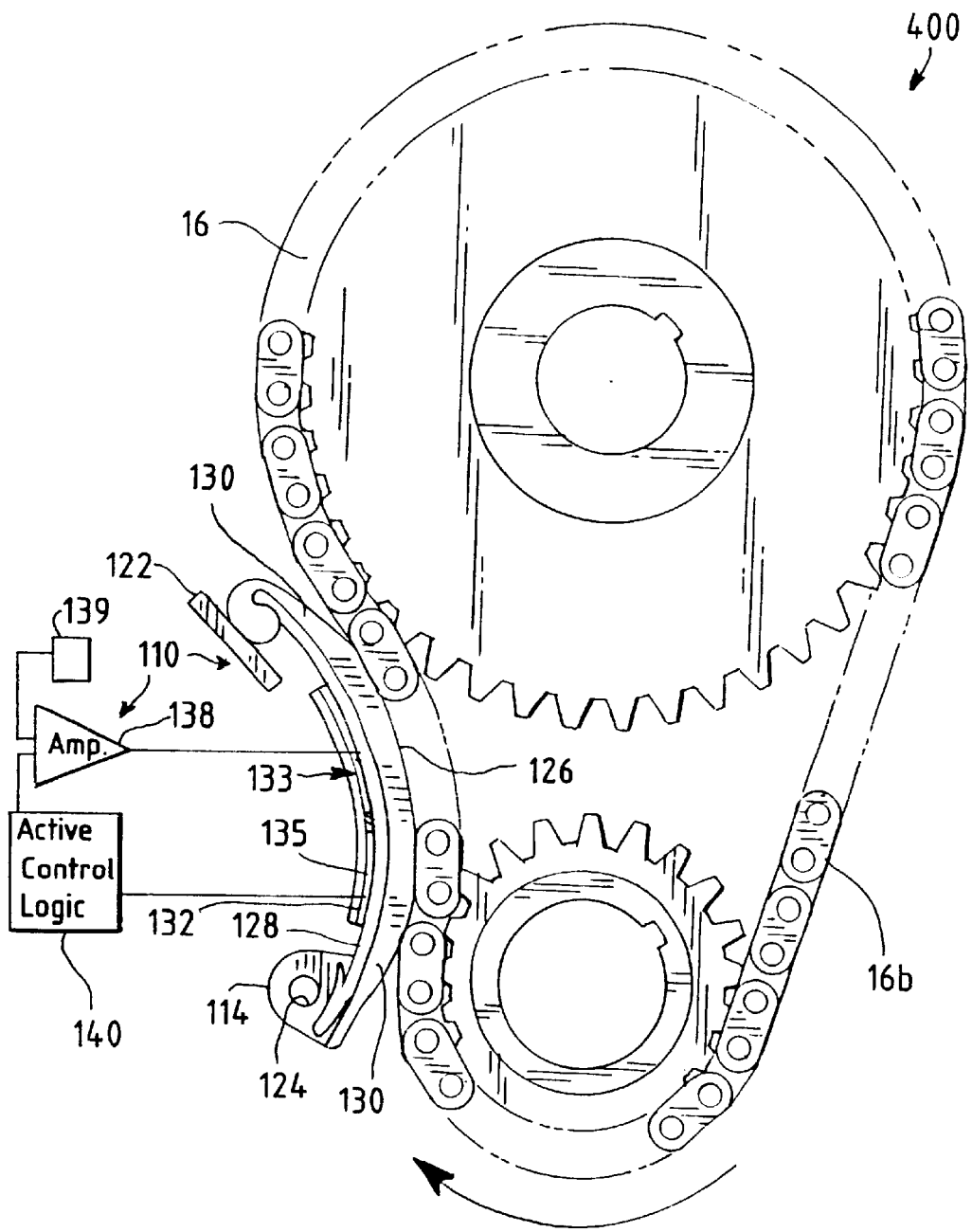
FIG. 8 is a schematic drawing of a chain tensioner system according to an embodiment of the invention which tensions a drive chain as it travels between a set of sprockets (i.e., a drive socket and a driven socket), using a tensioner of the type shown in FIG. 4.

FIG. 8 is a schematic drawing of a chain tensioner system 400 being used to tension drive chain 16, which includes strands 16*a* and 16*b*, as it travels between a set of sprockets (i.e., a drive socket 18 and a driven socket 20) using tensioner 110 of FIG. 4. As with the aspects discussed above, the tensioner system 400 may be mounted to control the inner or outer portions of the chain 16, and may be used in conjunction with other tensioners 110 to provide active damping on both the inner and outer portions of chain 16.

By using any of the damping and tensioning embodiments or equivalents thereof according to aspects of this invention, the present invention can reduce the vibrational energy in the blade tensioner, thereby increasing the durability of the blade tensioner system and thus increasing the useful life of the part.

In the foregoing specification, the invention has been described with reference to specific illustrative embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A power transmission chain and tensioner system for an automotive engine application, said chain tensioner and power transmission chain system comprising:

a plurality of sprockets including at least one driving sprocket connected to a power input and at least one driven sprocket connected to a power output;

a chain wrapped around the plurality of sprockets, the chain including at least a first strand portion having some of links being pulled by the driving sprocket and a second strand portion having some links pulling the driven sprocket; and a chain tensioner including: (i) a shoe having one end movably supported upon a stationary support surface and including a friction surface positioned in contact with at least one of the chain strands to exert force on the strand sufficient to provide tension in the chain, (ii) a blade spring operatively engaging and providing tension on the shoe, as a blade spring and shoe assembly, (iii) a piezoelectric strain actuator element operatively coupled to the blade spring and shoe assembly, and (iv) a circuit adapted to receive sensor signals generated by a sensor element coupled to the blade spring and shoe assembly, wherein the circuit interacts with the piezoelectric strain actuator element to induce a vibratory moment therein effective to dissipate the vibration sensed in the chain tensioner when a sensor signal is received by the circuit that is associated with a vibration occurring in the blade spring and shoe assembly at a predetermined frequency or in a predetermined frequency band.

2. The power transmission chain and tensioner system of claim 1, wherein the circuit comprises a passive analog resonance circuit tuned to a predetermined resonance frequency of vibration of the blade spring and shoe assembly of the chain tensioner to be controlled.

3. The power transmission chain and tensioner system of claim 2, wherein the resonance circuit comprises an analog resonant circuit tuned to a predetermined band of resonance frequencies of vibration of the blade spring and shoe assembly of the chain tensioner to be controlled.

4. The power transmission chain and tensioner system of claim 1, wherein the sensor element comprises a piezoelectric transducer sensing element and the circuit comprises a passive analog resonance circuit adapted to generate a feedback voltage supplied to the piezoelectric strain actuating element, wherein the feedback voltage is obtained by the circuit inverting the voltage supplied by the piezoelectric transducer sensing element and resulting from a vibration at the predetermined frequency or frequency band in the blade spring and shoe assembly, effective to create the vibratory moment in the piezoelectric strain actuating element which counteracts stress and strain in the blade spring and shoe assembly resulting from the vibration thereof to be controlled.

5. The power transmission chain and tensioner system of claim 4, wherein the piezoelectric strain actuating element and the piezoelectric transducer sensing element are arranged in parallel to each other in an integral electromechanical piezoelectric transducer module coupled to a surface of the blade spring.

6. The power transmission chain and tensioner system of claim 1, wherein the piezoelectric strain actuator element is coupled adjacent to the blade spring at least along a longitudinally central surface region thereof.

7. The power transmission chain and tensioner system of claim 1, wherein the piezoelectric strain actuator element is coupled to the blade spring adjacent a point of maximum deflection of the blade spring predetermined as being located where a bending vibration in the blade spring and shoe assembly occurs at a predetermined frequency or in a predetermined frequency band.

8. The power transmission chain and tensioner system of claim 1, further comprising a control unit adapted to provide an active vibration control in the chain tensioner, in which the control unit is adapted to process sensor signals received from the sensor element and indicating a vibratory frequency sensed at the blade spring and shoe assembly, and the control unit including a microprocessor controller and control circuit for generating electric energy having a voltage, frequency and phase effective to induce a vibratory moment in the piezoelectric strain actuating element coupled thereto, when supplied thereto, effective to counteract and dissipate the vibration sensed in the blade spring and shoe assembly.

9. The power transmission chain and tensioner system of claim 8, wherein the control unit further comprises an amplifier, which is powered by a power source, having an input coupled to the output of the control circuit and an output for applying the electric energy to the piezoelectric strain actuator element, such that vibration of the chain tensioner is controlled by application of the electric energy from the amplifier to the piezoelectric strain actuator element.

10. The power transmission chain and tensioner system of claim 9, wherein the control unit has a control map of frequency versus phase, and the output signal generated by the control circuit is based on the control map.

11. The power transmission chain and tensioner system of claim 8, wherein the sensor element comprises an accelerometer.

12. The power transmission chain and tensioner system of claim 1, wherein the sensed vibratory frequency comprises a predetermined resonant vibratory frequency.

13. The power transmission chain and tensioner system of claim 1, wherein the piezoelectric strain actuator is coupled to one of the blade spring and the shoe.

14. A tensioner system, comprising:
at least one blade spring engaging a shoe as an assembly adapted to impart tension to a separate component movable relative thereto and in surface contact therewith;
a piezoelectric strain actuator element operatively coupled to the blade spring and shoe assembly; and
a circuit adapted to receive sensor signals generated by a sensor element coupled to the blade spring and shoe assembly, wherein the circuit interacts with the piezoelectric strain actuator element to induce a vibratory moment therein effective to reduce the vibration sensed in the chain tensioner when a sensor signal is received by the circuit that is associated with a vibration occurring in the blade spring and shoe assembly at a predetermined frequency or in a predetermined frequency band.

15. The tensioner system of claim 14, wherein the blade spring and shoe assembly are adapted to impart tension to a chain traveling over a surface of the shoe.

16. The tensioner system of claim 15, wherein the circuit comprises a passive analog resonance circuit tuned to a predetermined resonance frequency of vibration of the blade spring and shoe assembly of a chain tensioner to be controlled.

17. The tensioner system of claim 16, wherein the resonance circuit comprises an analog resonant circuit tuned to a predetermined band of resonance frequencies of vibration of the blade spring and shoe assembly of the chain tensioner to be controlled.

18. The tensioner system of claim 14, wherein the sensor element comprises a piezoelectric transducer sensing element and the circuit comprises a passive analog resonance circuit adapted to generate a feedback voltage supplied to the piezoelectric strain actuating element, wherein the feedback voltage is obtained by the circuit inverting the voltage supplied by the piezoelectric transducer sensing element and resulting from a vibration at the predetermined frequency or frequency band in the blade spring and shoe assembly, effective to create the vibratory moment in the piezoelectric strain actuating element which counteracts stress and strain in the blade spring and shoe assembly resulting from the vibration thereof to be controlled.

19. The tensioner system of claim 18, wherein the piezoelectric strain actuating element and the piezoelectric transducer sensing element are arranged in parallel to each other in an integral electromechanical piezoelectric transducer module coupled to a surface of the blade spring.

20. The tensioner system of claim 14, wherein the piezoelectric strain actuator element is coupled adjacent to the blade spring at least along a longitudinally central surface region thereof.

21. The tensioner system of claim 14, wherein the piezoelectric strain actuator element is coupled to the blade spring adjacent a point of maximum deflection of the blade spring predetermined as being located where a bending vibration in the blade spring and shoe assembly occurs at a predetermined frequency or in a predetermined frequency band.

22. The tensioner system of claim 14, further comprising a control unit adapted to provide an active vibration control in the chain tensioner, in which control unit is adapted to process sensor signals received from the sensor element and indicating a vibratory frequency sensed at the blade spring and shoe assembly, and the control unit including a microprocessor controller and control circuit for generating electric energy having a voltage, frequency and phase effective to induce a vibratory moment in the piezoelectric strain actuating element coupled thereto, when supplied thereto, effective to counteract and dissipate the vibration sensed in the blade spring and shoe assembly.

23. The tensioner system of claim 22, wherein the sensed vibratory frequency comprises a predetermined resonant vibratory frequency.

24. The tensioner system of claim 22, wherein the control unit further comprises an amplifier, which is powered by a power source, having an input coupled to the output of the control circuit and an output for applying the electric energy to the piezoelectric strain actuator element, such that vibration of the chain tensioner is controlled by application of the electric energy from the amplifier to the piezoelectric strain actuator element.

25. The tensioner system of claim 22, wherein the control unit has a control map of frequency versus phase, and the output signal generated by the control circuit is based on the control map.

26. The tensioner system of claim 22, wherein the sensor element comprises an accelerometer.

27. The tensioner system of claim 14, wherein the piezoelectric strain actuator is coupled to one of the blade spring and the shoe.

28. A chain tensioner system, comprising:
at least one biasing means engaging a chain-tension imparting means;
a piezoelectric strain actuator means operatively coupled to the biasing means and the chain-tension imparting means assembly; and
a control means adapted to receive sensor signals generated by a sensor element means coupled to the biasing means and the chain-tension imparting means assembly, wherein the control means interacts with the piezoelectric strain actuator means to induce a vibratory moment therein effective to reduce the vibration sensed in the biasing means and the chain-tension imparting means assembly when a sensor signal is received by the control means that is associated with a vibration occurring in the biasing means and the chain-tension imparting means assembly at a predetermined frequency or in a predetermined frequency band.

29. A method of providing chain tension and reducing vibration in a chain tensioner system, comprising the steps of:
providing a plurality of sprockets including at least one driving sprocket connected to a power input and at least one driven sprocket connected to a power output, and a chain wrapped around the plurality of sprockets, wherein the chain includes at least a first strand portion having some of links being pulled by the driving sprocket and a second strand portion having some links pulling the driven sprocket;
providing a chain tensioner including a shoe having one end movably supported upon a stationary support surface and including a friction surface positioned in contact with at least one of the chain strands to exert force on the strand sufficient to provide tension in the chain, a blade spring engaging the shoe, a piezoelectric strain actuating element operatively coupled to the blade spring and the shoe assembly, and a circuit coupled to the piezoelectric strain actuating element and adapted to receive sensor signals generated by a sensor element coupled to the blade spring and shoe assembly;
rotating the chain around the sprockets moving the chain;
supplying, from the sensor element, a sensor signal to the circuit in response to vibration of the blade spring and shoe assembly at a predetermined frequency or in a predetermined frequency band;
generating electrical energy using the circuit, the electrical energy having a voltage, frequency and phase effective to induce a vibratory moment in the piezoelectric strain actuating element, when supplied thereto, which counteracts and dissipates the vibration sensed in the blade spring and shoe assembly; and
supplying the electrical energy to the piezoelectric strain actuating element effective to dissipate the vibration within the tensioner.

30. The method of claim 29, further comprising, prior to the rotating, selecting the circuit as comprising a passive analog resonance circuit tuned to a predetermined resonance frequency or frequency band of vibration of the blade spring and shoe assembly of the chain tensioner to be controlled.

31. The method of claim 29, further comprising, prior to the rotating, selecting the sensor element as comprising a piezoelectric transducer sensing element and selecting the circuit as comprising a passive analog resonance circuit adapted to generate a feedback voltage supplied to the piezoelectric strain actuating element, wherein the feedback voltage is obtained by the circuit inverting the voltage supplied by the piezoelectric transducer sensing element and resulting from a vibration at the predetermined frequency or frequency band in the blade spring and shoe assembly, effective to create the vibratory moment in the piezoelectric strain actuating element which counteracts stress and strain in the blade spring and shoe assembly resulting from the vibration thereof to be controlled.

32. The method of claim 29, further comprising, prior to the rotating, arranging the piezoelectric strain actuating element and the piezoelectric transducer sensing element in parallel to each other in an integral electromechanical piezoelectric transducer module, and coupling said module to a surface of the blade spring.

33. The method of claim 29, further comprising, prior to the rotating, coupling the piezoelectric strain actuator element to the blade spring adjacent a point of maximum deflection of the blade spring predetermined as being located where a bending vibration in the blade spring and shoe assembly occurs at a predetermined frequency or in a predetermined frequency band.

34. The method of claim 29, further comprising providing a control unit providing an active vibration control in the chain tensioner, in which the control unit processes the sensor signals received from the sensor element, indicating a vibratory frequency sensed at the blade spring and shoe assembly, and the control unit including a microprocessor controller and control circuit for generating electric energy having a voltage, frequency and phase effective to induce a vibratory moment in the piezoelectric strain actuating element coupled thereto, when supplied thereto, effective to counteract and dissipate the vibration sensed in the blade spring and shoe assembly.

35. The method of claim 34, wherein the providing of the control unit further comprises including an amplifier powered by a power source, the amplifier having an input coupled to the output of the control circuit and an output applying the electric energy to the piezoelectric strain actuator element, such that vibration of the chain tensioner is controlled by application of the electric energy from the amplifier to the piezoelectric strain actuator element.

* * * * *